United States Patent
Lam et al.

(10) Patent No.: US 10,029,345 B2
(45) Date of Patent: Jul. 24, 2018

(54) METHODS AND COMPOSITIONS FOR PROCESSING DIELECTRIC SUBSTRATE

(71) Applicant: Cabot Microelectronics Corporation, Aurora, IL (US)

(72) Inventors: Viet Lam, Naperville, IL (US); Ji Cui, Aurora, IL (US)

(73) Assignee: Cabot Microelectronics Corporation, Aurora, IL (US)

( * ) Notice: Subject to any disclaimer, the term of this patent is extended or adjusted under 35 U.S.C. 154(b) by 0 days.

(21) Appl. No.: 15/207,973

(22) Filed: Jul. 12, 2016

(65) Prior Publication Data

US 2017/0014969 A1  Jan. 19, 2017

Related U.S. Application Data (60) Provisional application No. 62/191,824, filed on Jul. 13, 2015.

(51) Int. Cl.
*H01L 21/302* (2006.01)
*H01L 21/461* (2006.01)
*B24B 37/04* (2012.01)
*C09G 1/02* (2006.01)

(52) U.S. Cl.
CPC .............. *B24B 37/044* (2013.01); *C09G 1/02* (2013.01)

(58) Field of Classification Search
USPC ............................................ 216/89; 438/693
See application file for complete search history.

(56) References Cited

U.S. PATENT DOCUMENTS

| | | | |
|---|---|---|---|
| 7,442,645 B2 | 10/2008 | Carter et al. | |
| 7,955,520 B2 | 6/2011 | White et al. | |
| 8,247,327 B2 | 8/2012 | De Rege Thesauro et al. | |
| 8,486,169 B2 | 7/2013 | Carter et al. | |
| 2004/0152309 A1* | 8/2004 | Carter | C03C 19/00 438/689 |
| 2010/0029181 A1* | 2/2010 | De Rege Thesauro | B24B 37/044 451/37 |

FOREIGN PATENT DOCUMENTS

TW  200426932 A  12/2004

OTHER PUBLICATIONS

Taiwan Intellectual Property Office, Search Report issued in connection with Taiwan Patent Application No. 105122097 dated May 31, 2007.

* cited by examiner

Primary Examiner — Roberts Culbert
(74) Attorney, Agent, or Firm — Thomas Omholt; Erika S. Wilson; Francis J. Koszyk (57) ABSTRACT

Described are materials and methods for processing (polishing or planarizing) a substrate that contains pattern dielectric material using a polishing composition (aka "slurry") and an abrasive pad, e.g., CMP processing.

5 Claims, 4 Drawing Sheets

METHODS AND COMPOSITIONS FOR PROCESSING DIELECTRIC SUBSTRATE

FIELD OF THE INVENTION

The invention relates to materials and methods for processing (polishing or planarizing) a substrate that contains pattern dielectric material using a polishing composition (aka "slurry") and an abrasive pad, e.g., CMP processing.

BACKGROUND

In processes of fabricating microelectronic devices, multiple layers of conducting, semiconducting, and dielectric materials are deposited onto a surface of a substrate in a stepwise fashion. Portions of the layers may be removed, followed by further processing by selectively adding and removing materials, all with great precision. As layers are deposited onto and then removed from the substrate, the uppermost surface of the substrate may become non-planar. Before adding more material, the non-planar surface is sometimes processed by "planarization" to produce a smooth surface for a subsequent layer and processing.

Planarizing or polishing a non-planar surface is a process where material of a non-planar surface is removed to leave a highly planar surface. Planarization is useful to remove undesired surface topography such as a rough (un-even) surface, or defects such as agglomerated materials, crystal lattice damage, scratches, or contaminated layers or materials. In one particular use, planarization removes excess material that has been deposited over a substrate surface to fill features such as channels or holes of a lower layer or layers or holes, if the deposited layer exhibits an un-even surface.

Chemical-mechanical planarization, or chemical-mechanical polishing (CMP), is an established commercial technique for planarize substrates in microdevice fabrication. CMP uses a liquid chemical composition known as a CMP composition, alternately a polishing composition, a polishing slurry, or just slurry, in combination with a CMP pad, to mechanically and chemically remove material from a non-planar substrate surface. A slurry can be typically applied to a substrate by contacting the surface of the substrate with a CMP polishing pad to which the slurry has been applied. Material is typically removed from the substrate surface by a combination of mechanical activity of abrasive material contained in the slurry, and chemical activity of chemical materials of the slurry.

To advance the eternal objective of reducing sizes of microelectronic devices, components that make up the devices must be smaller and must be positioned ever more closely together. Electrical isolation between circuits is important for ensuring optimum semiconductor performance, but becomes increasingly difficult with smaller devices. To that end, various fabrication methods involve etching shallow trenches into a semiconductor substrate and then filling the trenches with insulating material, thereby isolating nearby active regions of an integrated circuit. One example of such a process is referred to as shallow trench isolation (STI). This is a process in which a semiconductor layer is formed on a substrate, shallow trenches are formed in the semiconductor layer via etching or photolithography, and dielectric material is deposited over the etched surface to fill the trenches.

To ensure complete filling of trenches, an excess amount of the dielectric material is deposited over the etched surface. The deposited dielectric material (e.g., a silicon oxide) conforms to the topography of the underlying semiconductor substrate, including at the trenches. Thus, after the dielectric material has been placed, the surface of the deposited dielectric material is characterized by an uneven combination of raised areas of the dielectric material separated by trenches in the dielectric material, the raised areas and trenches of the dielectric material aligning with corresponding raised areas and trenches of the underlying surface. The region of the substrate surface that includes the raised dielectric material and trenches is referred to as a pattern field of the substrate, e.g., as "pattern material," "pattern oxide," "pattern dielectric," etc. This region is characterized by a "step height," which is the difference in height of the raised areas of the dielectric material relative to the trench height.

Excess dielectric material that makes up the raised areas is removed by a CMP process to produce a planar surface. During removal of the raised area material, an amount of material of the trenches will also be removed. This removal of material from the trenches is referred to as "trench loss." In a useful process the rate of removal of material from trenches is well below the rate of removal from raised areas. Thus, as material of the raised areas is removed (at a faster rate compared to material being removed from the trenches) the pattern dielectric becomes a highly planarized surface that may be referred to as a "blanket" region of the processed substrate surface, e.g., "blanket dielectric" or "blanket oxide."

Chemical Mechanical polishing processes for removing pattern dielectric materials can be characterized by performance parameters that include: various polishing rates (i.e., removal rate), trench loss, planarization efficiency, and a highly desired property of "self-stopping" behavior.

Trench loss is the amount (thickness, e.g., in Angstroms (Å)) of material removed from trenches in achieving planarization of pattern material by eliminating an initial step height. Trench loss is calculated as the initial trench thickness minus a final trench thickness.

Removal rate refers to a rate of removal of material from a surface of a substrate and is usually expressed in terms of units of length (thickness) per unit of time (e.g., Angstroms (Å) per minute). Different removal rates relating to different regions of a substrate, or to different stages of a polishing step, can be important in assessing process performance. A "pattern removal rate" is the rate of removal of dielectric material from raised areas of pattern dielectric at a stage of a process during which a substrate exhibits a substantial step height. "Blanket removal rate" refers to a rate of removal of dielectric material from a planarized (i.e., "blanket") dielectric material at an end of a polishing step, when step height has been significantly (e.g., essentially entirely) reduced.

Planarization efficiency relates to trench loss that occurs, per step height reduction, in achieving a planar surface, i.e., step height reduction divided by trench loss.

In various dielectric polishing steps (e.g., of an STI process) the rate of removal of pattern dielectric is typically a rate-limiting factor of the overall process. Therefore, high removal rates of pattern dielectric (the "pattern removal rate") are desired to increase throughput. Good efficiency in the form of relatively low trench loss is also very important. Further, if the removal rate of dielectric remains high after achieving planarization (i.e., the "blanket removal rate"), overpolishing occurs, resulting in added trench loss.

In certain particularly unique and advantageous processes, overpolishing and associated trench loss can be avoided if a blanket removal rate is especially low. A related and highly desirable performance property is referred to as "self-stopping" behavior. Self-stopping behavior is a highly uncommon process feature, especially in processes that also include high pattern removal rate. In a self-stopping process, when a large percentage of topography thickness (e.g., raised portions) has been removed, the removal rate decreases dramatically. With self-stopping behavior the removal rate is effectively high while a significant step height is present at the substrate surface, but will then become extremely low when the surface becomes effectively planar.

Advantages of self-stopping slurries result from the reduced blanket removal rate, which produces a wide endpoint window. As one practical effect, self-stopping behavior can allow for processing of substrates having reduced dielectric film thickness, allowing for a reduced amount of material to be deposited over a structured lower layer. Also, the need for endpoint detection can be eliminated and planarization can be more efficient. Substrates can be polished with lower trench loss by avoiding overpolishing or unnecessary removal of dielectric after planarization.

Need exists for ongoing improvement in CMP compositions and processes of chemical-mechanical planarization and polishing, including for processing substrates that contain pattern dielectric materials (e.g., silicon oxide). Desired compositions and methods should perform at useful or advantageously high pattern removal rates, while also providing improved planarization efficiency by way of reduced or low levels of trench loss. In highly preferred embodiments, a slurry and process can exhibit self-stopping behavior.

SUMMARY

Described herein are CMP polishing compositions (aka "slurries") and method for using a polishing composition to process (e.g., planarize, polish) a surface of a substrate that includes a region of pattern dielectric material, i.e., a substrate with at least a portion of its surface having raised areas and trenches. The substrate can be any substrate that includes an area of pattern dielectric, examples including substrates undergoing fabrication into a flat panel display, integrated circuit, memory or rigid disk, inter-layer dielectric (ILD) device, microelectromechanical system (MEMS), 3D NAND device, among others.

In one exemplary method, the polishing composition and methods are particularly well suited for planarizing or polishing a substrate that has undergone shallow trench isolation (STI) or a similar process, whereby a continuous layer of dielectric material such as silicon oxide is coated over a structured lower layer of semiconductor material such as silicon.

Another type of substrate for which slurries and processes of the present description are particularly useful is a 3D NAND flash memory device substrate. Processing a 3D NAND flash memory device involves building memory components in three dimensions, whereas previous flash memory components have been built in only two dimensions. Like processes for preparing many other microelectronic devices, steps of fabricating 3D NAND devices can include coating dielectric material over a structured substrate, then removing an amount of resultant pattern dielectric to planarize the dielectric material. The process includes factors of step height reduction, trench loss, and planarization efficiency that are familiar to processes for earlier types of devices that include pattern dielectric. But, new to processes of preparing a 3D NAND device, substrates exhibit increased step heights that have not generally been present in pattern dielectric materials of earlier substrates.

Step heights present at pattern dielectric regions of 3D NAND device substrates may exceed one or two microns (i.e., 10,000 or 20,000 angstroms), which is much higher than step heights of previous pattern dielectric materials. A greater step height necessarily requires that a significantly higher amount of dielectric material must be removed from pattern dielectric to produce a planarized surface. Past steps of removing pattern dielectric have involved removal of amounts of dielectric material in a range from as low as 5 angstroms, to as high as about 7,000 angstroms. With 3D NAND devices, a dielectric removal (planarization or polishing) step may be required to remove at least 10,000 angstroms of dielectric material from a raised area, e.g., up to or exceeding 20,000, 30,000, or 40,000 angstroms. As 3D NAND and other types of devices and their fabrication processes continue to advance and improve, this amount of removed material could increase to even higher levels, e.g., up to 50,000 angstroms, 70,000 angstroms, or more.

For efficiency and throughput of commercial fabrication processes, the time required to remove this increased amount of dielectric material cannot be extended. Steps required to remove this dielectric material in a commercial process should take not more than 3 minutes, e.g., should take less than 2 minutes or most preferably less than 1 minute. Also, steps of removing the dielectric material must achieve good planarization efficiency, not involving an impractical amount of trench loss.

The substrate can include the pattern dielectric region at a surface, and may optionally contain other regions or fields that are not pattern dielectric. In preferred methods, the surface does not contain metal (e.g., tungsten, aluminum, silver, copper), or contains not more than a minor amount of metal, e.g., less than 50 percent metal based on total surface area, preferably less than 30, 20, 10, 5, or 1 percent metal based on total surface area.

The polishing compositions include a liquid carrier, hydroxamic acid or substituted hydroxamic acid, abrasive particles dispersed in the liquid carrier, and may optionally also include other chemical materials, additives, or minor ingredients such as surfactant, catalyst, oxidant, inhibitor, pH-adjuster, among others. The slurry has a pH that is below about 7.

The hydroxamic acid or substituted hydroxamic acid has the formula:

wherein R is selected from the group consisting of: hydrogen, alkyl, cycloalkyl, aryl, heterocyclic alkyl, and heterocyclic aryl, any of which may be substituted. The term "alkyl" as used herein refers to a branched or straight un-substituted hydrocarbon group, generally refers to a saturated group, but does allow for a small degree of unsaturation (e.g., a single carbon-carbon double bond, or two carbon-carbon double bonds). A "substituted" group refers to a group in which a carbon-bonded hydrogen is replaced by a non-hydrogen atom such as a halide, or by a functional group such as an amine, hydroxide, etc.

Preferred polishing compositions can be used to process a CMP substrate that contains a region of pattern dielectric. Preferred slurries and processes can result in a high removal rate of the pattern dielectric material, low trench loss, and high planarization efficiency. Some particularly preferred slurries and processes also exhibit self-stopping behavior.

In one aspect, the invention relates to a method of polishing a dielectric-containing surface of a substrate, the method. The method includes providing a substrate having a surface that includes pattern dielectric material with raised areas of the dielectric material and trench areas of the dielectric material, a difference between a height of the raised areas and a height of the trench areas being step height; providing a polishing pad;

providing a chemical-mechanical polishing composition that includes: an aqueous medium, abrasive particles dispersed in the aqueous medium, and hydroxamic acid or substituted hydroxamic acid of the formula:

wherein R is selected from the group consisting of: hydrogen, alkyl, cycloalkyl, aryl, heterocyclic alkyl, and heterocyclic aryl, any of which may be substituted. The slurry has a pH below about 7. The method further includes contacting the substrate with the polishing pad and the chemical-mechanical polishing composition; and moving the polishing pad and the chemical-mechanical polishing composition relative to the substrate to abrade at least a portion of the silicon oxide layer on a surface of the substrate to polish the substrate.

In another aspect the invention relates to a chemical-mechanical polishing composition useful for polishing a dielectric-containing substrate. The composition includes: aqueous medium, abrasive particles dispersed in the aqueous medium, and hydroxamic acid or substituted hydroxamic acid of the formula:

wherein R is selected from the group consisting of: hydrogen, alkyl, cycloalkyl, aryl, heterocyclic alkyl, and heterocyclic aryl, any of which may be substituted. The slurry has a pH of below about 7.

In yet another aspect the invention relates to a chemical-mechanical polishing composition useful for polishing a dielectric-containing substrate, the composition including: aqueous medium, ceria or ceria-containing particles dispersed in the aqueous medium, and hydroxamic acid or substituted hydroxamic acid of the formula:

wherein R is selected from the group consisting of: hydrogen, alkyl, cycloalkyl, aryl, heterocyclic alkyl, and heterocyclic aryl, any of which may be substituted. The slurry has a pH of below about 7.

DETAILED DESCRIPTION

Described as follows are CMP polishing compositions, aka "polishing slurries," "polishing compositions," "slurries," and the like, that are useful for removing dielectric material from a dielectric-containing surface of a substrate. The slurry is useful for polishing or planarizing a surface of a substrate that contains a region of pattern dielectric material. Preferred slurries can be useful to polish or planarize the pattern dielectric material using a process that also performs at a high removal rate of the pattern dielectric material, and that provides low trench loss and high polishing efficiency. Particularly preferred and advantageous slurries can be used in processes that additionally exhibit self-stopping behavior.

A slurry as described includes liquid carrier, hydroxamic acid or substituted hydroxamic acid, and abrasive particles dispersed in the liquid carrier. The slurry may optionally include other chemical materials, additives, or minor ingredients such as surfactant, catalyst, oxidant, inhibitor, a pH-adjuster, among others.

Hydroxamic acid and substituted hydroxamic acid are described by the formula:

wherein R is selected from the group consisting of: hydrogen, alkyl, cycloalkyl, heterocyclic alkyl, aryl, and heterocyclic aryl, any of which may be substituted. The term "alkyl" as used herein allows for branching and straight-chain groups, and generally refers to a saturated group (e.g., $-C_nH_{2n+1}$) but does allow for a small degree of unsaturation, e.g., one carbon-carbon double bond, or two carbon-carbon double bonds. A "substituted" group refers to a group in which a carbon-bonded hydrogen is replaced by a non-hydrogen atom such as a halide, or by a functional group such as an amine, hydroxide, etc. The hydroxamic acid or substituted hydroxamic acid can be included in a polishing composition in any chemical form, such as a free acid form or as a salt.

In certain embodiments the hydroxamic acid or substituted hydroxamic acid is a substituted hydroxamic acid wherein R is 2-hydroxyphenyl, a $C_1$ to $C_5$ branched or straight chain alkyl-substituted phenyl, or a $C_1$ to $C_5$ branched or straight chain alkyl (e.g., saturated) group. One preferred substituted hydroxamic acid is salicylhydroxamic acid:

Hydroxamic acid, various substituted hydroxamic acids, and salicylhydroxamic acid are commercially available in forms (e.g., salt or acid) and purities useful in a CMP slurry and CMP processing. Salicylhydroxamic acid (SHA) (aka SHAM, 2-Hydroxybenzenecarbohydroxamic acid, 2-Hydroxybenzohydroxamic acid, N,2-Dihydroxybenzamide) is commercially available at 99 percent purity from Sigma-Aldrich Co. LLC, St. Louis, Mo. Salicylhydroxamic acid may be substituted with halogen or an amino group on the ring, wherein the halogen includes chlorine, bromine and fluorine, and wherein the amino group includes —$NR_2$ substitution, wherein each R is independently H or a $C_1$-$C_2$ alkyl.

The hydroxamic acid, substituted hydroxamic acid, or salicylhydroxamic acid, can be present in a slurry at any amount useful to provide desired CMP processing performance, with preferred performance including a desirably high dielectric removal rate when polishing pattern dielectric, a desirably low blanket removal rate, desirably low trench loss, desirably high planarization efficiency, and self-stopping performance in highly preferred slurries and CMP processes. Certain exemplary slurries can include from about 5 to about 3,000 parts per million (ppm) hydroxamic acid, substituted hydroxamic acid, or salicylhydroxamic acid (i.e., per convention, milligrams hydroxamic acid, substituted hydroxamic acid, or salicylhydroxamic acid, per liter slurry); for example from about 50 to about 2,000 ppm, from about 100 ppm to about 1,500 ppm, about 100 ppm to about 1,200 ppm, about 100 ppm to about 1,000 ppm, about 100 ppm to about 800 ppm, about 100 ppm to about 750 ppm, about 100 ppm to about 650 ppm, about 100 ppm to about 500 ppm, about 250 ppm to about 1000 ppm, about 250 ppm to about 800 ppm, about 500 ppm to about 1000 ppm, or about 500 ppm to about 800 ppm.

A slurry as described can include any useful type or amount of abrasive particles. Preferred slurries include particles that are effective to polish or planarize a non-metal portion of a substrate such as pattern dielectric, e.g., a pattern oxide region of a substrate surface. Examples of preferred abrasive particles include particles of ceria (e.g. $CeO_2$) or zirconia (e.g. $ZrO_2$), silica (any of various forms) or a combination of these.

Because the slurries can be particularly useful in polishing pattern dielectric, the particles do not need to include, and can preferably exclude, any substantial amount of abrasive particles that are intended to remove a metal such as copper, silver, tungsten, or another metal, from a substrate surface. Accordingly, abrasive particles of preferred slurries can consist of or can consist essentially of ceria particles, zirconia particles, silica particles, or a combination of these, and can preferably exclude any more than an insubstantial amount of any particles useful to polish or planarize a metal substrate surface, such particles including certain types of metal oxides known to be useful for polishing a metal surface, e.g., alumina, silica, silica oxides, among others. Such a slurry may contain not more than 0.1 weight percent of abrasive particles other than ceria-based or zirconia-based particles, based on total weight slurry, e.g., less than 0.05 or 0.01 weight percent of abrasive particles other than ceria or zirconia-based particles, based on total weight slurry. Alternately stated, such a slurry may contain not more than 0.5 weight percent of abrasive particles other than ceria-based or zirconia-based particles based on total weight abrasive particles in the slurry, e.g., less than 0.1, 0.05, or 0.01 weight percent of abrasive particles other than ceria-, or zirconia-based particles, based on total weight abrasive particles in the slurry.

Ceria particles useful for polishing dielectric materials are well known in the CMP arts and are commercially available. Examples include types referred to as wet-process ceria, calcined ceria, and metal-doped ceria, among others. Likewise, zirconia particles useful for polishing dielectric materials are well known in the CMP arts and are commercially available. Examples include metal-doped zirconia and non-metal-doped zirconia, among others. Among metal doped zirconia are cerium-, calcium-, magnesium-, or yttrium-doped zirconia with dopant element weight percentage preferentially in a range from 0.1-25%.

Certain preferred ceria particles for use in a slurry as described include those described in Applicant's co-pending U.S. Provisional patent application Ser. No. 14/639,564, filed March, 2015, entitled "Polishing Composition Containing Ceria Abrasive." A preferred polishing composition of the present description can contain abrasive particles as described in that provisional application, including wet-process ceria particles. Therein, slurries are described that may contain a single type of abrasive particles or multiple different types of abrasive particles, based on size, composition, method of preparation, particle size distribution, or other mechanical or physical properties. That description and the present description refer to slurries that contain "first" abrasive particles, meaning that the slurry contains at least this "first" type of abrasive particles, and may optionally contain (but is not required to contain) additional abrasive particles that are different from the "first" abrasive particles.

Ceria abrasive particles can be made by a variety of different processes. For example, ceria abrasive particles can be precipitated ceria particles or condensation-polymerized ceria particles, including colloidal ceria particles.

As one more particular example, ceria abrasive particles (e.g., as the first abrasive particles) can be wet-process ceria particles made according to the following process. A first step in synthesizing wet-process ceria particles can be to dissolve a ceria precursor in water. The ceria precursor can be any suitable ceria precursor, and can include a ceria salt having any suitable charge, e.g., $Ce^{3+}$ or $Ce^{4+}$. Suitable ceria precursors include, for example, cerium III nitrate, cerium IV ammonium nitrate, cerium III carbonate, cerium IV sulfate, and cerium III chloride. Preferably, the ceria precursor is cerium III nitrate.

The pH of the ceria precursor solution can be increased to form amorphous $Ce(OH)_3$. The pH of the solution can be increased to any suitable pH, for example to a pH of about 10 or more, e.g., a pH of about 10.5 or more, a pH of about 11 or more, or a pH of about 12 or more. Typically, the solution will have a pH of about 14 or less, e.g., a pH of about 13.5 or less, or a pH of about 13 or less. Any suitable base can be used to increase the pH of the solution. Suitable bases include, for example, KOH, NaOH, NH$_4$OH, and tetramethylammonium hydroxide. Organic bases such as ethanolamine and diethanolamine are also suitable. The solution will become white and cloudy as the pH increases and amorphous Ce(OH)$_3$ is formed.

The ceria precursor solution typically is mixed for several hours, such as for about 1 hour or more, e.g., about 2 hours or more, about 4 hours or more, about 6 hours or more, about 8 hours or more, about 12 hours or more, about 16 hours or more, about 20 hours or more, or about 24 hours or more. Typically, the solution is mixed for about 1 hour to about 24 hours, e.g., about 2 hours, about 8 hours, or about 12 hours. When mixing is complete, the solution can be transferred to a pressurized vessel and heated.

The ceria precursor solution can then be heated to any suitable temperature. For example, the solution can be heated to a temperature of about 50° C. or more, e.g., about 75° C. or more, about 100° C. or more, about 125° C. or more, about 150° C. or more, about 175° C. or more, or about 200° C. or more. Alternatively, or in addition, the solution can be heated to a temperature of about 500° C. or less, e.g., about 450° C. or less, about 400° C. or less, about 375° C. or less, about 350° C. or less, about 300° C. or less, about 250° C. or less, about 225° C., or about 200° C. or less. Thus, the solution can be heated to a temperature within a range bounded by any two of the aforementioned endpoints. For example, the solution can be heated to a temperature of about 50° C. to about 300° C., e.g., about 50° C. to about 275° C., about 50° C. to about 250° C., about 50° C. to about 200° C., about 75° C. to about 300° C., about 75° C. to about 250° C., about 75° C. to about 200° C., about 100° C. to about 300° C., about 100° C. to about 250° C., or about 100° C. to about 225° C.

The ceria precursor solution typically is heated for several hours. For example, the solution can be heated for about 1 hour or more, e.g., about 5 hours or more, about 10 hours or more, about 25 hours or more, about 50 hours or more, about 75 hours or more, about 100 hours or more, or about 110 hours or more. Alternately, or in addition, the solution can be heated for about 200 hours or less, e.g., about 180 hours or less, about 165 hours or less, about 150 hours or less, about 125 hours or less, about 115 hours or less, or about 100 hours or less. Thus, the solution can be heated for a time period bounded by any two of the aforementioned endpoints. For example, the solution can be heated for about 1 hour to about 150 hours, e.g., about 5 hours to about 130 hours, about 10 hours to about 120 hours, about 15 hours to about 115 hours, or about 25 hours to about 100 hours.

After heating, the ceria precursor solution can be filtered to separate the precipitated ceria particles. The precipitated particles can be rinsed with excess water to remove unreacted ceria precursor. The mixture of precipitated particles and excess water can be filtered following each rinse step to remove impurities. Once adequately rinsed, the ceria particles can be dried for additional processing, e.g., sintering, or the ceria particles can be directly redispersed.

The ceria particles optionally can be dried and sintered prior to redispersion. The terms "sintering" and "calcining" are used interchangeably herein to refer to the heating of the ceria particles under the conditions described below. Sintering the ceria particles impacts their resulting crystallinity. Without wishing to be bound by any particular theory, it is believed that sintering the ceria particles at high temperatures and for extended periods of time reduces defects in the crystal lattice structure of the particles. Any suitable method can be used to sinter the ceria particles. As an example, the ceria particles can be dried, and then can be sintered at an elevated temperature. Drying can be carried out at room temperature, or at an elevated temperature. In particular, drying can be carried out at a temperature of about 20° C. to about 40° C., e.g., about 25° C., about 30° C., or about 35° C. Alternatively, or in addition, drying can be carried out at an elevated temperature of about 80° C. to about 150° C., e.g., about 85° C., about 100° C., about 115° C., about 125° C., or about 140° C. After the ceria particles have been dried, they can be ground to create a powder. Grinding can be carried out using any suitable grinding material, such as zirconia.

The ceria particles can be sintered in any suitable oven, and at any suitable temperature. For example, the ceria particles can be sintered at a temperature of about 200° C. or more, e.g., about 215° C. or more, about 225° C. or more, about 250° C. or more, about 275° C. or more, about 300° C. or more, about 350° C. or more, or about 375° C. or more. Alternatively, or in addition, the ceria particles can be sintered at a temperature of about 1000° C. or less, e.g., about 900° C. or less, about 750° C. or less, about 650° C. or less, about 550° C. or less, about 500° C. or less, about 450° C. or less, or about 400° C. or less. Thus, the ceria particles can be sintered at a temperature bounded by any two of the aforementioned endpoints. For example, the ceria particles can be sintered at a temperature of about 200° C. to about 1000° C., e.g., about 250° C. to about 800° C., about 300° C. to about 700° C., about 325° C. to about 650° C., about 350° C. to about 600° C., about 350° C. to about 550° C., about 400° C. to about 550° C., about 450° C. to about 800° C., about 500° C. to about 1000° C., or about 500° C. to about 800° C.

The ceria particles can be sintered for any suitable length of time. For example, the ceria particles can be sintered for about 1 hour or more, e.g., about 2 hours or more, about 5 hours or more, or about 8 hours or more. Alternatively, or in addition, the ceria particles can be sintered for about 20 hours or less, e.g., about 18 hours or less, about 15 hours or less, about 12 hours or less, or about 10 hours or less. Thus, the ceria particles can be sintered for a time period bounded by any two of the aforementioned endpoints. For example, the ceria particles can be sintered for about 1 hour to about 20 hours, e.g., about 1 hour to about 15 hours, about 1 hour to about 10 hours, about 1 hour to about 5 hours, about 5 hours to about 20 hours, or about 10 hours to about 20 hours. Ceria particles also can be sintered at various temperatures and for various lengths of time within the ranges described above. For example, the ceria particles can be sintered in a zone furnace, which exposes the ceria particles to one or more temperatures for various lengths of time. As an example, the ceria particles can be sintered at a temperature of about 200° C. to about 1000° C. for about 1 hour or more, and then can be sintered at a different temperature that is within the range of about 200° C. to about 1000° C. for about 1 hour or more.

After drying, grinding, and optional sintering, etc., ceria particles can be redispersed in a suitable liquid carrier, e.g., an aqueous carrier, particularly water. If the ceria particles are sintered, then the ceria particles are redispersed after the completion of sintering. Any suitable process can be used to redisperse the ceria particles. Typically, the ceria particles are redispersed by lowering the pH of a mixture of the ceria particles and water using a suitable acid. As pH is lowered, the surfaces of ceria particles develop a cationic zeta potential. This cationic zeta potential creates repulsive forces between the ceria particles, which facilitates their redispersion. Any suitable acid can be used to lower the pH of the mixture. Examples of suitable acids include hydrochloric acid and nitric acid. Organic acids that are highly water-soluble and have hydrophilic functional groups also are suitable. Suitable organic acids include, for example, acetic acid, among others. Acids with multivalent anions, such as $H_3PO_4$ and $H_2SO_4$, generally are not preferred. The mixture can be lowered to any suitable pH. For example, the pH of the mixture can be lowered to about 2 to about 5, e.g., about 2.5, about 3, about 3.5, about 4, or about 4.5. Typically, the pH of the mixture is not lowered to less than about 2.

The redispersed ceria particles typically are milled to reduce their particle size. Preferably, ceria particles can be milled simultaneously with redispersion. Milling can be carried out using any suitable milling material, such as zirconia. Milling also can be carried out using sonication or wet-jet procedures. After milling, the ceria particles can be filtered to remove any remaining large particles. For example, the ceria particles can be filtered using a filter having a pore size of about 0.3 µm or more, e.g., about 0.4 µm or more, or about 0.5 µm or more.

Certain preferred abrasive particles (e.g., first abrasive particles) can have a median particle size of about 40 nm to about 100 nm. The particle size of a particle is the diameter of the smallest sphere that encompasses the particle. Particle size can be measured using any of various known and suitable techniques. For example, particle size can be measured using a disc centrifuge, i.e., by differential centrifugal sedimentation (DCS). Suitable disc centrifuge particle size measurement instruments are commercially available, such as from CPS Instruments (Prairieville, La.), e.g., CPS Disc Centrifuge Model DC24000UHR. Unless specified otherwise, the median particle size values reported and claimed herein are based on disc centrifuge measurements.

Preferred ceria abrasive particles (e.g., first abrasive particles) can have a median particle size of about 40 nm or more, e.g., about 45 nm or more, about 50 nm or more, about 55 nm or more, about 60 nm or more, about 65 nm or more, about 70 nm or more, about 75 nm or more, or about 80 nm or more. Alternatively, or in addition, ceria abrasive particles can have a median particle size of about 100 nm or less, e.g., about 95 nm or less, about 90 nm or less, about 85 nm or less, about 80 nm or less, about 75 nm or less, about 70 nm or less, or about 65 nm or less. Thus, ceria abrasive particles can have a median particle size within a range bounded by any two of the aforementioned endpoints. For example, ceria abrasive particles (e.g., first abrasive particles) can have a median particle size of about 40 nm to about 100 nm, e.g., about 40 nm to about 80 nm, about 40 nm to about 75 nm, about 40 nm to about 60 nm, about 50 nm to about 100 nm, about 50 nm to about 80 nm, about 50 nm to about 75 nm, about 50 nm to about 70 nm, about 60 nm to about 100 nm, about 60 nm to about 80 nm, about 60 nm to about 85 nm, or about 65 nm to about 75 nm. Preferred abrasive particles (e.g., first abrasive particles) can have a median particle size of about 60 nm to about 80 nm, e.g., a median particle size of about 65 nm, a median particle size of about 70 nm, or a median particle size of about 75 nm.

Abrasive particles (e.g., first abrasive particles) can be present in a polishing composition at any useful concentration (e.g., per total weight of the concentration). An exemplary range of useful concentrations can be from about 0.005 to about 2 weight percent of the polishing composition. For example, first abrasive particles can be present in a polishing composition at a concentration of about 0.005 weight percent or more, e.g., about 0.0075 weight percent or more, about 0.01 weight percent or more, about 0.025 weight percent or more, about 0.05 weight percent or more, about 0.075 weight percent or more, about 0.1 weight percent or more, or about 0.25 weight percent or more.

Alternately, or in addition, first abrasive particles can be present in a polishing composition at a concentration of about 2 weight percent or less, e.g., about 1.75 weight percent or less, about 1.5 weight percent or less, about 1.25 weight percent or less, about 1 weight percent or less, about 0.75 weight percent or less, about 0.5 weight percent or less, or about 0.25 weight percent or less. Thus, abrasive particles (e.g., first abrasive particles) can be present in a polishing composition at a concentration within a range bounded by any two of the aforementioned endpoints. For example, abrasive particles (e.g., first abrasive particles) can be present in the polishing composition at a concentration of about 0.005 weight percent to about 2 weight percent, e.g., about 0.005 weight percent to about 1.75 weight percent, about 0.005 weight percent to about 1.5 weight percent, about 0.005 weight percent to about 1.25 weight percent, about 0.005 weight percent to about 1 weight percent, about 0.01 weight percent to about 2 weight percent, about 0.01 weight percent to about 1.5 weight percent, about 0.05 weight percent to about 2 weight percent, about 0.05 weight percent to about 1.5 weight percent, about 0.1 weight percent to about 2 weight percent, about 0.1 weight percent to about 1.5 weight percent, or about 0.1 weight percent to about 1 weight percent.

Preferred slurries can contain first abrasive particles as described in an amount useful to function as a CMP polishing composition as described herein. Examples of useful concentration ranges can be from about 0.1 weight percent to about 0.5 weight percent based on total weight polishing composition, e.g., about 0.15 weight percent to about 0.4 weight percent, about 0.15 weight percent to about 0.35 weight percent, or about 0.2 weight percent to about 0.3 weight percent. More preferably, a slurry may contain first abrasive particles at a concentration of about 0.1 weight percent to about 0.3 weight percent, e.g., about 0.1 weight percent, about 0.15 weight percent, about 0.2 weight percent, about 0.25 weight percent, about 0.28 weight percent, or about 0.29 weight percent based on total weight polishing composition.

Preferred first abrasive particles can have a particle size distribution of at least about 300 nm. Particle size distribution refers to the difference between the particle size of the largest particle and the particle size of the smallest particle. For example, first abrasive particles can have a particle size distribution of at least about 315 nm, e.g., at least about 320 nm, at least about 325 nm, at least about 330 nm, at least about 340 nm, at least about 350 nm, at least about 355 nm, at least about 360 nm, at least about 365 nm, at least about 370 nm, at least about 375 nm, or at least about 380 nm. Preferably, first abrasive particles have a particle size distribution of at least about 320 nm, e.g., at least about 325 nm, at least about 335 nm, or at least about 350 nm. First abrasive particles can also preferably have a particle size distribution of about not greater than 500 nm, e.g., about 475 nm or less, about 450 nm or less, about 425 nm or less, or about 415 nm or less. Thus, abrasive particles (e.g., first abrasive particles) can have a particle size distribution within a range bounded by any two of the aforementioned endpoints. For example, abrasive particles can have a particle size distribution of about 315 nm to about 500 nm, e.g., about 320 nm to about 480 nm, about 325 nm to about 475 nm, about 335 nm to about 460 nm, or about 340 nm to about 450 nm.

The first abrasive particles as described can have any suitable largest particle size and any suitable smallest particle size, with preferred particles having a particle size distribution of is at least about 300 nm. For example, the abrasive particles can have a smallest particle size of about 1 nm to about 50 nm, e.g., about 1 nm to about 40 nm, about 1 nm to about 30 nm, about 1 nm to about 25 nm, about 1 nm to about 20 nm, about 5 nm to about 25 nm, or about 10 nm to about 25 nm. Preferably, the first abrasive particles have a smallest particle size of about 10 nm to about 30 nm, e.g., about 15 nm, about 20 nm, or about 25 nm. Abrasive particles can have a largest particle size of about 250 nm to about 500 nm, e.g., about 250 nm to about 450 nm, about 250 nm to about 400 nm, about 300 nm to about 500 nm, or about 300 nm to about 400 nm. Preferably, the first abrasive particles have a largest particle size of about 350 nm to about 450 nm, e.g., about 375 nm, about 400 nm, or about 425 nm.

Abrasive particles (e.g., first abrasive particles) made according to the process described herein can be screened according to the methods described above to identify first abrasive particles having the preferred surface chemistry described herein, e.g., first abrasive particles having a median particle size of about 40 nm to about 100 nm and a particle size distribution of at least about 300 nm, wherein the first abrasive particles have a surface that comprises tridentate hydroxyl groups, and wherein the first abrasive particles have a surface coverage of tridentate hydroxyl groups that is about $2.0 \times 10^{-5}$ moles/m$^2$ or more, and/or first abrasive particles having a median particle size of about 40 nm to about 100 nm and a particle size distribution of at least about 300 nm, wherein a Raman spectrum of the first abrasive particles comprises a peak at about 458 cm$^{-1}$ and a peak at about 583 cm$^{-1}$, and wherein the ratio of the intensity of the peak at about 458 cm$^{-1}$ to the intensity of the peak at about 583 cm$^{-1}$ is about 100 or less. The polishing compositions described herein preferably contain first abrasive particles made according to the process described hereinabove, and having the preferred surface chemistry also described hereinabove.

A polishing composition can optionally contain additional abrasive particles (e.g., second abrasive particles, third abrasive particles, etc.). Additional abrasive particles can be, for example, metal oxide abrasive particles of a different metal than the first abrasive particles, such as metal oxide abrasive particles of zirconia (e.g., zirconium oxide), titania (e.g., titanium dioxide), germania (e.g., germanium dioxide, germanium oxide), magnesia (e.g., magnesium oxide), nickel oxide, co-formed products thereof, or combinations thereof. The additional abrasive particles also can be organic particles of gelatin, latex, cellulose, polystyrene, or polyacrylate. Alternately, the polishing composition can contain first abrasive particles that are wet-process ceria particles having a median particle size of about 40 nm to about 100 nm and a particle size distribution of at least about 300 nm, wherein the polishing composition does not include any additional abrasive particles.

The additional abrasive particles also can be metal oxide abrasive particles of ceria (e.g., cerium oxide) that are a different type of ceria as compared to first abrasive particles of the polishing composition, i.e., ceria particles that are not wet-process ceria particles, such as fumed ceria particles or calcined ceria particles. Alternately, the polishing composition can contain first abrasive particles that are wet-process ceria particles having a median particle size of about 40 nm to about 100 nm and a particle size distribution of at least about 300 nm, wherein the polishing composition does not include any additional ceria particles.

Additional abrasive particles also can be wet-process ceria particles that have different surface chemistry compared to a preferred surface chemistry of first abrasive particles as described herein, e.g., wet-process ceria particles that have a surface that does not include a substantial level of tridentate hydroxyl groups; wet-process ceria particles that have surface tridentate hydroxyl groups as described herein but wherein the particles have a surface coverage of tridentate hydroxyl groups that is less than about $2.3 \times 10^{-5}$ moles/m$^2$; wet-process ceria particles, wherein a Raman spectrum of the particles does not exhibit a peak at about 583 cm$^-$; or wet-process ceria particles, wherein a Raman spectrum of the wet-process ceria particles exhibits a peak at about 458 cm$^{-1}$ and a peak at about 583 cm$^{-1}$, and wherein the ratio of the intensity of the peak at about 458 cm$^{-1}$ to the intensity of the peak at about 583 cm$^{-1}$ is greater than about 100.

As another alternative, the polishing composition can contain first abrasive particles that are wet-process ceria particles having a median particle size of about 40 nm to about 100 nm and a particle size distribution of at least about 300 nm, and having the preferred surface chemistry described herein, wherein the polishing composition does not include any additional wet-process ceria particles. For example, the polishing composition can include first abrasive particles that are wet-process ceria particles having a median particle size of about 40 nm to about 100 nm and a particle size distribution of at least about 300 nm, wherein the first abrasive particles have a surface that includes tridentate hydroxyl groups, wherein the first abrasive particles have a surface coverage of tridentate hydroxyl groups that is about $2.3 \times 10^{-5}$ moles/m$^2$ or more, and wherein the polishing composition does not include any additional wet-process ceria particles. A polishing composition may alternately contain first abrasive particles that are wet-process ceria particles having a median particle size of about 40 nm to about 100 nm and a particle size distribution of at least about 300 nm, wherein a Raman spectrum of the first abrasive particles includes a peak at about 458 cm$^{-1}$ and a peak at about 583 cm$^{-1}$, wherein the ratio of the intensity of the peak at about 458 cm$^{-1}$ to the intensity of the peak at about 583 cm$^{-1}$ is about 100 or less, and wherein the polishing composition does not include any additional wet-process ceria particles.

Certain polishing composition embodiments can contain first abrasive particles that are wet-process ceria particles having a median particle size of about 40 nm to about 100 nm and a particle size distribution of at least about 300 nm, wherein the polishing composition does not include any additional wet-process ceria particles.

When the polishing composition includes additional abrasive particles (e.g., second abrasive particles, third abrasive particles, etc.), the additional abrasive particles can have any suitable median particle size. For example, the polishing composition can include second abrasive particles having a median particle size of about 1 nm to about 60 nm, e.g., about 1 nm to about 55 nm, about 1 nm to about 50 nm, about 1 nm to about 40 nm, about 1 nm to about 35 nm, about 1 nm to about 30 nm, about 1 nm to about 25 nm, about 1 nm to about 20 nm, about 5 nm to about 50 nm, about 5 nm to about 35 nm, or about 15 nm to about 30 nm. Alternately, second abrasive particles can have a median particle size of about 100 nm to about 350 nm, e.g., about 100 nm to about 300 nm, about 105 nm to about 350 nm, about 115 nm to about 350 nm, about 135 nm to about 325 nm, about 150 nm to about 315 nm, about 175 nm to about 300 nm, about 200 nm to about 275 nm, or about 225 nm to about 250 nm. Preferably, additional abrasive particles (e.g., second abrasive particles, third abrasive particles, etc.) can have a median particle size of about 1 nm to about 35 nm, or a median particle size of about 125 nm to about 300 nm.

Additional abrasive particles (e.g., second abrasive particles, third abrasive particles, etc., in total) can be present in the polishing composition at any suitable amount, in addition to first abrasive particles. In certain slurry embodiments, additional abrasive particles can be present at a concentration of about 0.005 weight percent to about 2 weight percent based on total weight of the slurry. For example, additional abrasive particles can be present in a polishing composition at a concentration of about 0.005 weight percent or more, e.g., about 0.0075 weight percent or more, about 0.01 weight percent or more, about 0.025 weight percent or more, about 0.05 weight percent or more, about 0.075 weight percent or more, about 0.1 weight percent or more, or about 0.25 weight percent or more. Alternately, or in addition, additional abrasive particles can be present in a polishing composition at a concentration of about 2 weight percent or less, e.g., about 1.75 weight percent or less, about 1.5 weight percent or less, about 1.25 weight percent or less, about 1 weight percent or less, about 0.75 weight percent or less, about 0.5 weight percent or less, or about 0.25 weight percent or less based on total weight of the slurry. Thus, additional abrasive particles can be present in a polishing composition at a concentration within a range bounded by any two of the aforementioned endpoints. For example, a preferred polishing composition can include (in addition to an amount of first abrasive particles as described) second abrasive particles at a concentration of about 0.005 weight percent to about 2 weight percent, e.g., about 0.005 weight percent to about 1.75 weight percent, about 0.005 weight percent to about 1.5 weight percent, about 0.005 weight percent to about 1.25 weight percent, about 0.005 weight percent to about 1 weight percent, about 0.01 weight percent to about 2 weight percent, about 0.01 weight percent to about 1.75 weight percent, about 0.01 weight percent to about 1.5 weight percent, about 0.05 weight percent to about 2 weight percent, about 0.05 weight percent to about 1.5 weight percent, about 0.1 weight percent to about 2 weight percent, or about 0.1 weight percent to about 1.5 weight percent. More preferably, the additional abrasive particles can be present at a concentration of about 0.01 weight percent to about 0.5 weight percent, e.g., about 0.025 weight percent, about 0.05 weight percent, about 0.08 weight percent, about 0.1 weight percent, about 0.15 weight percent, about 0.2 weight percent, about 0.25 weight percent, about 0.3 weight percent, or about 0.4 weight percent, based on total weight of the slurry.

When a polishing composition contains additional abrasive particles (e.g., second abrasive particles, third abrasive particles, etc.), the polishing composition optionally can exhibit a multimodal particle size distribution. As used herein, the term "multimodal" means that the polishing composition exhibits a particle size distribution having at least 2 maxima (e.g., 2 or more maxima, 3 or more maxima, 4 or more maxima, or 5 or more maxima). In particular, when the polishing composition contains second abrasive particles, the polishing composition can exhibit a bimodal particle size distribution, i.e., the polishing composition exhibits a particle size distribution having 2 median particle size maxima. The terms "maximum" and "maxima" mean a peak or peaks in the particle size distribution. The peak or peaks correspond to the median particle sizes described herein for the first, second, and any additional abrasive particles. Thus, for example, when a polishing composition contains first abrasive particles and second abrasive particles, with no additional abrasive particles, a plot of the number of particles or relative weight of the particles versus particle size can reflect a bimodal particle size distribution, with a first peak in the particle size range of about 40 nm to about 100 nm and a second peak in the particle size range of about 1 nm to about 35 nm.

The first abrasive particles and any additional abrasive particles present in the polishing composition desirably are suspended in the polishing composition, more specifically in the aqueous carrier of the polishing composition. When the abrasive particles are suspended in the polishing composition, the abrasive particles preferably are colloidally stable. The term colloid refers to the suspension of abrasive particles in the aqueous carrier. Colloidal stability refers to the maintenance of that suspension over time. In the context of this invention, abrasive particles are considered colloidally stable if, when the abrasive particles are placed in a 100 ml graduated cylinder and allowed to stand unagitated for a time of 2 hours, the difference between the concentration of particles in the bottom 50 ml of the graduated cylinder ([B] in terms of g/ml) and the concentration of particles in the top 50 ml of the graduated cylinder ([T] in terms of g/ml) divided by the initial concentration of particles in the abrasive composition ([C] in terms of g/ml) is less than or equal to 0.5 (i.e., $\{[B]-[T]\}/[C] \le 0.5$). The value of $[B]-[T]/[C]$ desirably is less than or equal to 0.3, and preferably is less than or equal to 0.1.

The polishing composition can exhibit a pH that is below about 7, e.g., from about 1 to about 6. Typically, the polishing composition has a pH of about 3 or greater. Also, the pH of the polishing composition typically is about 6 or less. For example, the pH can be in the range of about 3.5 to about 6, e.g., a pH of about 3.5, a pH of about 4, a pH of about 4.5, a pH of about 5, a pH of about 5.5, a pH of about 6, or a pH in a range defined by any two of these pH values.

Preferred polishing compositions further include a pH-adjusting agent, which can be any suitable pH-adjusting agent. For example, the pH-adjusting agent can be an alkyl amine, an alcohol amine, quaternary amine hydroxide, ammonia, or a combination thereof. In particular, the pH-adjusting agent can be triethanolamine, tetramethylammonium hydroxide (TMAH or TMA-OH), or tetraethylammonium hydroxide (TEAH or TEA-OH). In certain preferred embodiments the pH-adjusting agent can be triethanolamine.

The pH-adjusting agent can be present in the polishing composition in any suitable concentration. Desirably, the pH-adjusting agent is present in an amount to achieve or maintain the pH of the polishing composition within a pH range set forth herein, e.g., below about 7, such as in the range of about 1 to about 6, or in the range of about 3.5 to about 5. For example, pH-adjusting agent can be present in the polishing composition at a concentration of about 10 ppm to about 300 ppm, e.g., about 50 ppm to about 200 ppm, or about 100 ppm to about 150 ppm.

The polishing composition includes an aqueous carrier that contains water (e.g., deionized water) and may optionally contain one or more water-miscible organic solvents. Examples of organic solvents that can be used include alcohols such as propenyl alcohol, isopropyl alcohol, ethanol, 1-propanol, methanol, 1-hexanol, and the like; aldehydes such as acetylaldehyde and the like; ketones such as acetone, diacetone alcohol, methyl ethyl ketone, and the like; esters such as ethyl formate, propyl formate, ethyl acetate, methyl acetate, methyl lactate, butyl lactate, ethyl lactate, and the like; ethers including sulfoxides such as dimethyl sulfoxide (DMSO), tetrahydrofuran, dioxane, diglyme, and the like; amides such as N, N-dimethylformamide, dimethylimidazolidinone, N-methylpyrrolidone, and the like; polyhydric alcohols and derivatives of the same such as ethylene glycol, glycerol, diethylene glycol, diethylene glycol monomethyl ether, and the like; and nitrogen-containing organic compounds such as acetonitrile, amylamine, isopropylamine, imidazole, dimethylamine, and the like. Preferably, the aqueous carrier is water alone without the presence of organic solvent or with only an insignificant amount of organic solvent, such as less than 0.1, 0.05, 0.01, or 0.005 weight percent organic solvent.

The polishing composition can include additional ingredients as additives. One example of optional additive is an anionic copolymer derived from monomers that include: a carboxylic acid monomer, a sulfonated monomer or a phosphonated monomer, and an acrylate monomer. Other examples include other polymers (e.g., nonionic polymers) including polyvinylpyrrolidones, polyethylene glycols (e.g., polyethylene glycol), and a polyvinylalcohols (e.g., a copolymer of 2-hydroxyethylmethacrylic acid and methacrylic acid). Still other optional additives include silanes such as amino silanes, ureido silanes, and a glycidyl silanes. And still other optional additives include: an N-oxide of a functionalized pyridine (e.g., picolinic acid N-oxide); a starch; a cyclodextrin (e.g., alpha-cyclodextrin or beta-cyclodextrin); or combinations of two or more of these.

Polyvinylpyrrolidone can be useful as an additive, and can have any suitable molecular weight. For example, polyvinylpyrrolidone as an additive can have a molecular weight about 10,000 grams per mole (g/mol) to about 1,000,000 g/mol, e.g., up to or about 20,000 g/mol, 30,000 g/mol, 40,000 g/mol, 50,000 g/mol, or 60,000 g/mol.

When a slurry includes nonionic polymer as an additive, and when the nonionic polymer is polyethylene glycol, the polyethylene glycol can have any suitable molecular weight. For example, the polyethylene glycol can have a molecular weight of about 200 g/mol to about 200,000 g/mol, e.g., about 8000 g/mol, about 100,000 g/mol. When a slurry includes silane as an additive, the silane can be any suitable amino silane, ureido silane, or glycidyl silane. Some specific examples include 3-aminopropyltrimethoxysilane, 3-aminopropylsilanetriol, N-(2-aminoethyl)-3-aminopropyltrimethoxysilane, N-(2-aminoethyl)-3-aminopropyltrimethoxysilanetriol, (N,N-dimethyl-3-aminopropyl)trimethoxysilane, N-phenyl-3-aminopropyltrimethoxysilane, ureidopropyltriethoxysilane, and 3-glycidopropyldimethylethoxysilane.

Certain particularly preferred additives in a polishing composition include copolymers of 2-hydroxyethylmethacrylic acid and methacrylic acid; polyvinylpyrrolidone; aminopropylsilanetriol; picolinic acid N-oxide; picolinic acid, starch; alpha-cyclodextrin; beta-cyclodextrin; and combinations thereof.

An additive or additives (e.g., the anionic copolymer of a carboxylic acid monomer, a sulfonated monomer, or a phosphonated monomer, and an acrylate, a polyvinylpyrrolidone, or a polyvinylalcohol; the silane; the N-oxide of a functionalized pyridine' picolinic acid; the starch; the cyclodextrin; or a combination thereof, in total) can be present in a polishing composition as described at any suitable concentration. Preferably, additive or additives are present in the polishing composition at a concentration of about 1 ppm to about 500 ppm, e.g., about 5 ppm to about 400 ppm, about 10 ppm to about 400 ppm, about 15 ppm to about 400 ppm, about 20 ppm to about 400 ppm, about 25 ppm to about 400 ppm, about 10 ppm to about 300 ppm, about 10 ppm to about 250 ppm, about 30 ppm to about 350 ppm, about 30 ppm to about 275 ppm, about 50 ppm to about 350 ppm, or about 100 ppm to about 300 ppm. More preferably, additive or additives are present in the polishing composition at a concentration of about 1 ppm to about 300 ppm, e.g., about 1 ppm to about 275 ppm, about 1 ppm to about 250 ppm, about 1 ppm to about 100 ppm, about 1 ppm to about 50 ppm, about 10 ppm to about 250 ppm, about 10 ppm to about 100 ppm, or about 35 ppm to about 250 ppm. A polishing composition as described optionally also includes a cationic polymer.

The cationic polymer is selected from a quaternary amine, a cationic polyvinyl alcohol, a cationic cellulose, and combinations thereof. The polishing composition optionally can include a cationic polymer selected from a quaternary amine, a cationic polyvinyl alcohol, a cationic cellulose, and combinations thereof, in addition to one or more of the additives described above, i.e., one or more of an anionic copolymer of a carboxylic acid monomer, sulfonated monomer or a phosphonated monomer, and an acrylate; a polyvinylpyrrolidone or a polyvinylalcohol; polyethylene glycol; a nonionic polymer; a silane; an N-oxide of a functionalized pyridine; a starch; and a cyclodextrin. Alternatively, the polishing composition can include a cationic polymer without one or more of these additives described above.

A cationic polymer can be a polymer containing a quaternary amine group or made of quaternary amine monomers. For example, a cationic polymer can be a selected from poly(vinylimidazolium), a poly(methacryloyloxyethyltrimethylammonium) halide such as poly(methacryloyloxyethyltrimethylammonium) chloride (polyMADQUAT), a poly(diallyldimethylammonium) halide such as poly(diallyldimethylammonium) chloride (polyDADMAC), and polyquaternium-2. Preferably, when the cationic polymer is a quaternary amine polymer, the cationic polymer is poly(vinylimidazolium).

Alternately, a cationic polymer can be any suitable cationic polyvinyl alcohol or cationic cellulose. Preferably, the cationic polymer is a cationic polyvinyl alcohol. For example, the cationic polyvinyl alcohol can be the Nippon Gosei GOHSEFIMER K210™ polyvinyl alcohol product.

A cationic polymer (e.g., quaternary amine polymer, the cationic polyvinyl alcohol, the cationic cellulose, or a combination thereof, in total) can be present in a polishing composition at any suitable concentration, for example at a concentration of about 1 ppm to about 250 ppm, e.g., about 1 ppm to about 100 ppm, about 1 ppm to about 50 ppm, about 1 ppm to about 40 ppm, about 1 ppm to about 25 ppm, about 5 ppm to about 225 ppm, about 5 ppm to about 100 ppm, about 5 ppm to about 50 ppm, about 10 ppm to about 215 ppm, about 10 ppm to about 100 ppm, about 15 ppm to about 200 ppm, about 25 ppm to about 175 ppm, about 25 ppm to about 100 ppm, or about 30 ppm to about 150 ppm.

When the cationic polymer is poly(vinylimidazolium), the cationic polymer can preferably be present in a polishing composition at a concentration of about 1 ppm to about 10 ppm, e.g., about 2 ppm, about 5 ppm, about 6 ppm, about 7 ppm, about 8 ppm, or about 9 ppm. More preferably, when the cationic polymer is poly(vinylimidazolium), the cationic polymer can preferably be present in the polishing composition at a concentration of about 1 ppm to about 5 ppm, e.g., about 2 ppm, about 3 ppm, or about 4 ppm.

The polishing composition can also, optionally, include a carboxylic acid. The carboxylic acid can be any suitable carboxylic acid, e.g., having a pKa of about 1 to about 6, e.g., from about 2 to about 6, such as from about 3.5 to about 5. Examples of useful carboxylic acids include acetic acid, propionic acid, and butanoic acid.

A carboxylic acid can be present in the polishing composition at any suitable concentration. Preferably, the carboxylic acid is present in the polishing composition at a concentration of about 10 ppm to about 1000 ppm, e.g., about 10 ppm to about 500 ppm, about 10 ppm to about 250 ppm, about 25 ppm to about 750 ppm, about 25 ppm to about 500 ppm, about 25 ppm to about 250 ppm, about 30 ppm to about 250 ppm, about 35 ppm to about 350 ppm, about 50 ppm to about 425 ppm, about 55 ppm to about 400 ppm, or about 75 ppm to about 350 ppm. More preferably, the carboxylic acid can be present in the polishing composition at a concentration of about 25 ppm to about 150 ppm, e.g. about 40 ppm, about 50 ppm, about 60 ppm, about 75 ppm, about 100 ppm, or about 125 ppm.

Desirably, the pH of the polishing composition can be within about 2 units of the pKa of the carboxylic acid. As an example, if the pH of the polishing composition is about 3.5, the pKa of the carboxylic acid preferably is about 1.5 to about 5.5.

When the polishing composition includes cationic polymer, and when the cationic polymer is a quaternary amine polymer, the polishing composition preferably also includes a carboxylic acid. When the polishing composition includes cationic polymer, and the cationic polymer is selected from a cationic polyvinyl alcohol and a cationic cellulose, the polishing composition optionally further includes a carboxylic acid.

A polishing composition may optionally include one or more other additives such as a surfactant or rheological control agent, including viscosity enhancing agents and coagulants (e.g., polymeric rheological control agents, such as, for example, urethane polymers), a dispersant, a biocide (e.g., KATHON™ LX), or the like. Suitable surfactants include, for example, cationic surfactants, anionic surfactants, anionic polyelectrolytes, nonionic surfactants, amphoteric surfactants, fluorinated surfactants, mixtures thereof.

Preferred polishing compositions of the present description are designed to be used for CMP processing of dielectric materials, e.g., pattern dielectric. The polishing compositions, for this purpose, are not designed for and are not required to be effective in processing a metal surface of a substrate. Accordingly, these preferred polishing compositions can exclude abrasive and chemical ingredients of CMP compositions designed and effective for processing a metal surface, examples of such chemical ingredients being metal passivating agents and metal chelating agents. These preferred slurries do not require and can preferably exclude chemical ingredients that are intended to act as metal passivating agents or as metal chelating agents during CMP processing. This of course does not require that all slurries of this description exclude any form of ingredient that may exhibit some level of metal passivating or metal chelating behavior, especially to the extent that the presently-described slurries may be expressed as containing chemistry that might exhibit either metal passivating (e.g., salicylhydroxamic acid) or metal chelating behavior, if used in as a metal-processing CMP composition. Instead, a slurry embodiment can be useful without requiring an ingredient that is either intended or effective to cause metal passivation or metal chelation. Not including ingredients specifically described as useful in the present slurries that may exhibit some level of metal passivating (e.g., salicylhydroxamic acid) or metal chelating activity, some slurry embodiments can include not more than an insubstantial amount of ingredients that are metal passivating or metal chelating materials, e.g., less than 0.001, 0.0005, or 0.0001 weight percent metal passivating agent based on total slurry weight; e.g., less than 0.01, 0.005, or 0.001 weight percent metal chelating compound based on total slurry weight.

Examples of specific metal passivating agents that are not required in, and that may be specifically excluded from, a slurry of the present description are identified as "secondary film-forming metal-passivating agents" of compositions of U.S. Pat. No. 8,435,421 (the entirety of which is incorporated herein by reference) (see column 6, lines 29-67). These agents include compounds having the general formula (II): $Z-X^2(Y^2R^5)(Y^3R^6)$, as well as salts or other chemical (e.g., base or acid) forms of compounds of formula (II), and partially neutralized forms of formula (II).

In formula (II), Z is $NH_2$ or OH; $X^2$ is P=O or C; $Y^2$ and $Y^3$ are each independently N, NH, or O; and $R^5$ and $R^6$ can each independently be $R^7-(OCH_2CH_2)_n-$, wherein $R^7$ can be H, $C_1$-$C_{20}$-alkyl, phenyl, or $C_1$-$C_{20}$-alkyl-substituted phenyl, and wherein "n" has an average value in the range of about 2 to about 1000, or when $Y^2$ and $Y^3$ each independently are N or NH, then $R^5$ and $R^6$ each independently can be N, NH, or CH, and together form a five-membered ring heterocycle with $X^2$, $Y^2$ and $Y^3$. Preferably, $R^7$ is $C_1$-$C_{20}$-alkyl, phenyl, or $C_1$-$C_{20}$-alkyl-substituted phenyl. In some preferred embodiments, $R^7$ is $C_1$-$C_{20}$-alkyl-substituted phenyl, particularly nonylphenyl.

Non-limiting examples of compounds of formula (II) include heterocycles (e.g., 5-aminotetrazole, 5-amino-1,2,-4-triazole, and the like), and phosphate esters such as bis-pegylated phosphate esters, particularly phosphate esters that include poly(oxyethylene) chains attached to two oxygens of the phosphate group, wherein the poly(oxyethylene) chains are terminated by an aryl ether group (e.g., phenyl), an alkyl ether group (e.g., a $C_1$-$C_{20}$-alkyl, such as lauryl or stearyl), or an alkylaryl ether group (e.g., $C_1$-$C_{20}$-alkylphenyl, such as nonylphenyl). The term "poly(oxyethylene)" refers to a polymer or oligomer having an average of 2 to about 1000 oxyethylene ($-OCH_2CH_2-$) monomer units, preferably 2 to 100 (e.g., 5, 10, 20, 30, 40, 50, 60, 70, 80, or 90) oxyethylene units per poly(oxyethylene) chain. One specific example of a phosphate ester-type passivating agent is a bis-(nonylphenylpoly(oxyethylene)) phosphate ester (NPPOP), which is commercially available under the trade name SURFONIC™ PE 1198, from Huntsman.

Examples of specific metal chelating agents that are not required in, and that may be specifically excluded from, a slurry of the present description are identified in U.S. Pat. No. 8,435,421 at column 7, lines 17-51. These include oxalic acid, amino-substituted carboxylic acids (e.g., amino polycarboxylates, such as iminodiacetic acid (IDA), ethylenediaminedisuccinic acid (EDDS), iminodisuccinic acid (IDS), ethylenediaminetetraacetic acid (EDTA), nitrilotriacetic acid (NTA), as well as alpha-amino acids, such as glycine, beta-amino acids, and the like); hydroxyl-substituted carboxylic acids (e.g., glycolic acid and lactic acid, as well as hydroxyl polycarboxylic acids, such as malic acid, citric acid, tartaric acid, and the like); phosphonocarboxylic acids; aminophosphonic acids; salts of any of the foregoing; combinations of two or more of the foregoing; and the like.

A polishing composition can be prepared in any useful manner, many examples of which are known to those of skill. The polishing composition can be prepared in a batch or continuous process. Generally, the polishing composition can be prepared by combining its components in any order, with suitable mixing, to produce a uniform mixture (slurry) of the components. The term "component" as used herein includes individual ingredients (e.g., first abrasive particles, hydroxamic acid, or substituted hydroxamic acid, pH-adjusting agent, etc.) as well as any combination of ingredients.

For example, hydroxamic acid or substituted hydroxamic acid can be added to water at a desired concentration. The pH of the resultant aqueous solution can then be adjusted (as desired) and abrasive particles (e.g., first abrasive particles) can be added to the solution at a desired concentration to form the polishing composition. Other ingredients can also be incorporated into the solution at a time to allow uniform incorporation of the ingredients.

A polishing composition can be prepared soon or immediately prior to its use in a CMP process, with one or more components added to the polishing composition soon or shortly before use (e.g., within about 1 minute before use, or within about 1 hour before use, or within about 7 days before use). A polishing composition also can be prepared by mixing the components at the surface of the substrate during a CMP polishing operation or immediately before applying the slurry to a substrate.

In alternate embodiments, a polishing composition can be provided as a concentrate that is designed to be transported or stored commercially, then diluted for use with an appropriate amount of aqueous carrier, particularly water, at a time shortly before use. In these embodiments, the polishing composition concentrate can include first abrasive particles, hydroxamic acid or substituted hydroxamic acid, pH-adjusting agent, and water, in amounts such that, upon dilution of the concentrate with an appropriate amount of water, each component of the polishing composition will be present in the diluted polishing composition in an amount within the a range specified hereinabove for a polishing composition. Furthermore, the concentrate can contain a fraction of the aqueous carrier (e.g., water) present in the polishing composition during use, to ensure that other components are at least partially or fully dissolved in the concentrate.

While a polishing composition can be prepared well before, or even shortly before, use, the polishing composition also can be produced by mixing the components of the polishing composition at or near a point-of-use. As used herein, the term "point-of-use" refers to the point at which the polishing composition is applied to a substrate surface (e.g., the polishing pad or the substrate surface itself). When the polishing composition is to be prepared by point-of-use mixing, the components of the polishing composition are separately stored in two or more storage devices.

To mix components contained in storage devices to produce a polishing composition at or near a point-of-use, the storage devices typically are provided with one or more flow lines leading from each storage device to the point-of-use of the polishing composition (e.g., the platen, the polishing pad, or the substrate surface). The term "flow line" refers a path of flow from an individual storage container to the point-of-use of the component stored therein. The one or more flow lines can each lead directly to the point-of-use, or, in the situation where more than one flow line is used, two or more of the flow lines can be combined at any point into a single flow line that leads to the point-of-use. Furthermore, any of the one or more flow lines (e.g., the individual flow lines or a combined flow line) can first lead to one or more of the other devices (e.g., pumping device, measuring device, mixing device, etc.) prior to reaching the point-of-use of the component(s).

Components of a polishing composition can be delivered to the point-of-use independently (e.g., the components are delivered to the substrate surface whereupon the components are mixed during the polishing process), or the components can be combined immediately before delivery to the point-of-use. Components are combined "immediately before delivery to the point-of-use" if they are combined less than 10 seconds prior to reaching the point-of-use, preferably less than 5 seconds prior to reaching the point-of-use, more preferably less than 1 second prior to reaching the point of use, or even simultaneous to the delivery of the components at the point-of-use (e.g., the components are combined at a dispenser at the point-of-use such as at a substrate or polishing pad).

When two or more components of a polishing composition are combined prior to reaching a point-of-use, the components can be combined in the flow line and delivered to the point-of-use without the use of a mixing device. Alternatively, one or more of the flow lines can lead into a mixing device to facilitate the combination of two or more of the components. Any suitable mixing device can be used. For example, the mixing device can be a nozzle or jet (e.g., a high pressure nozzle or jet) through which two or more of the components flow. Alternately, a mixing device can be a container-type mixing device that includes one or more inlets by which two or more components of the polishing composition are introduced to the container-type mixing device, and at least one outlet through which mixed components exit to be delivered to the point-of-use, either directly or via other elements of the apparatus (e.g., via one or more flow lines). A mixing device may include a single chamber or more than one chamber, each chamber having at least one inlet and at least one outlet, wherein two or more components are combined in each chamber. If a container-type mixing device is used, the mixing device preferably includes a mixing mechanism to uniformly agitate and combine the components, preferably without producing undue foam or air entrapment. Mixing mechanisms are generally known in the art and include stirrers, blenders, agitators, paddled baffles, gas sparger systems, vibrators, etc.

A polishing composition as described may be useful for polishing any suitable substrate, and can be particularly useful for polishing a substrate that includes a dielectric-containing (e.g., silicon oxide-containing) surface, especially one having a region of pattern dielectric that includes raised dielectric areas separated by trench areas of dielectric material. Exemplary substrates include those being processed for use as a component of a flat panel display, integrated circuit, memory or rigid disk, inter-layer dielectric (ILD) device, microelectromechanical system (MEMS), 3D NAND device, or the like.

For a substrate of any type of device, the substrate surface includes a continuous yet structured (non-planar, non-smooth) layer of dielectric material that has been placed over a lower layer that also includes surface structure or topography. This structured, non-planar region of the dielectric layer surface is referred to as "pattern dielectric." It results from dielectric material being placed over the uneven structure of the lower layer to fill trenches or holes present in the lower layer. To ensure complete filling of all trenches or holes, etc., and full coverage over the surface of the lower layer that contains the trenches or holes, etc., the dielectric material is deposited in an excess amount. The dielectric material will conform to the uneven topography of the lower layer, producing a deposited continuous dielectric surface characterized by raised areas separated by trenches. The raised will be the locations of active polishing and material removal, meaning the location from which most of the dielectric material is removed. The pattern dielectric material is also characterized by what is referred to as a "step height," which is the height of the dielectric material of the raised locations relative to the height of the dielectric material at the adjacent trenches.

The polishing composition is particularly well suited for planarizing or polishing a substrate that has undergone shallow trench isolation (STI) or a similar process, whereby dielectric is coated over a structured lower layer to produce regions of pattern dielectric material. For a substrate that has undergone shallow trench isolation, typical step heights can be in a range from 1,000 angstroms to 7,000 angstroms.

Certain embodiments of the described polishing composition are also useful for planarizing or polishing a substrate that is an in-process 3D NAND flash memory device. In such substrates, a lower layer that is made of semiconductor layer that includes trenches, holes, or other structures that have a high aspect ratio, such as an aspect ratio of at least 10:1, 30:1, 60:1 or 80:1. When a surface having structures of such high aspect ratios is coated by dielectric material, the resultant pattern dielectric will exhibit a high step height, such as a step height that is substantially greater than 7,000 angstroms, e.g., greater than 10,000, 20,000, 30,000, or 40,000 angstroms, or more.

The dielectric layer of any of the devices described herein may comprise, consist essentially of, or consist of any suitable dielectric material, many of which are well known, including various forms of silicon oxide and silicon oxide-based dielectric materials. For example, a dielectric layer that includes silicon oxide or silicon oxide-based dielectric layer can comprise, consist of, or consist essentially of any one or more of: tetraethoxysilane (TEOS), high density plasma (HDP) oxide, phosphosilicate glass (PSG), borophosphosilicate glass (BPSG), high aspect ratio process (HARP) oxide, spin on dielectric (SOD) oxide, chemical vapor deposition (CVD) oxide, plasma-enhanced tetraethyl ortho silicate (PETEOS), thermal oxide, or undoped silicate glass.

In the past, some examples of substrates that require planarization of pattern dielectric have been prepared to include a silicon nitride layer (e.g., a "silicon nitride cap" or "liner") at a location below active polishing regions of pattern dielectric material, e.g., a "cap" over a land surface of a structured semiconductor layer. The silicon nitride is designed to cause a stop to polishing and removal of dielectric material at the active region, upon reaching the silicon nitride layer. The silicon nitride layer functions to halt removal of material in a polishing step in a manner intended to reduce trench loss and dishing in final topography. This step, however, adds significant cost to a manufacturing process and still may not fully prevent dishing.

According to processes of the present description, a substrate may include a silicon nitride liner located at locations of intended ends of a dielectric polishing and removal step. In other embodiments, a substrate does not require and can optionally and preferably exclude a silicon nitride "liner" or "cap" disposed at locations of an end a step of removing dielectric from an active area.

A substrate can be planarized or polished with the polishing composition described herein by any suitable technique, especially CMP processing using chemical-mechanical polishing (CMP) equipment. Typically, the CMP apparatus includes a platen, which, when in use, is in motion and has a velocity that results from orbital, linear, or circular motion; a polishing pad in contact with the platen and moving with the platen when in motion; and a carrier that holds a substrate to be polished by contacting and moving relative to the surface of the polishing pad. Polishing takes place by the substrate being placed in contact with a polishing composition as described, and typically a polishing pad, then removing at least a portion of the surface of the substrate, e.g., pattern dielectric material. Any suitable polishing conditions can be used.

A substrate can be planarized or polished with the chemical-mechanical polishing composition in conjunction with any suitable polishing pad (e.g., polishing surface). Suitable polishing pads include, for example, woven and non-woven polishing pads.

Moreover, suitable polishing pads can include any suitable polymer of varying density, hardness, thickness, compressibility, ability to rebound upon compression, and compression modulus. Suitable polymers include, for example, polyvinylchloride, polyvinylfluoride, nylon, fluorocarbon, polycarbonate, polyester, polyacrylate, polyether, polyethylene, polyamide, polyurethane, polystyrene, polypropylene, coformed products thereof, and mixtures thereof.

Optionally, the CMP apparatus includes an in situ polishing endpoint detection system, many of which are known in the art. Techniques for inspecting and monitoring the polishing process by analyzing light or other radiation reflected from a surface of the workpiece are known in the art. Such methods are described, for example, in U.S. Pat. No. 5,196,353, U.S. Pat. No. 5,433,651, U.S. Pat. No. 5,609,511, U.S. Pat. No. 5,643,046, U.S. Pat. No. 5,658,183, U.S. Pat. No. 5,730,642, U.S. Pat. No. 5,838,447, U.S. Pat. No. 5,872,633, U.S. Pat. No. 5,893,796, U.S. Pat. No. 5,949,927, and U.S. Pat. No. 5,964,643. Desirably, the inspection or monitoring of the progress of the polishing process with respect to a workpiece being polished enables the determination of the polishing end-point, i.e., the determination of when to terminate the polishing process with respect to a particular workpiece.

Figure 1:
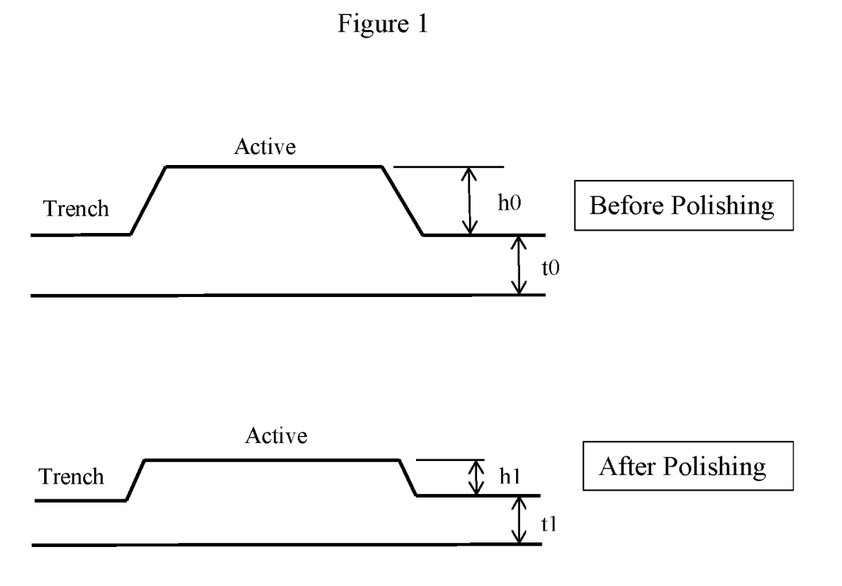
FIG. 1 (not to scale) illustrates a cross-sectional view of example substrates useful according to the present description.

According to preferred methods, pattern dielectric is planarized and polished to reduce a step height between raised areas (having initial height h0) and trenches (having initial trench thickness t0, see FIG. 1). To accomplish this planarization effectively and efficiently, the process should include a high removal rate of raised areas (active) of pattern dielectric material, along with a substantially lower removal rate of dielectric material of trenches. Most preferably, the process also exhibits self-stopping functionality.

During CMP polishing or planarization, dielectric material is removed from raised areas, and from trenches in smaller amounts. During polishing, the height of raised areas decreases to eventually be essentially level with the height of trenches. This can mean, for example, that step height is reduced to less than 1,000 angstroms, e.g., less than 900, 500, 300, or 250 angstroms. Reducing the height of raised areas 12 removes the pattern of raised areas among the trenches, effectively removing the pattern and converting the pattern to a field of planarized dielectric, i.e., "blanket' dielectric or "blanket oxide," meaning a substantially planarized region of dielectric material.

Depending on the substrate being processed, an initial step height may be at least 1,000, 2,000, or 5,000 angstroms, and may be substantially greater, such as greater than 7,000 angstroms, or at least 10,000, 20,000, 30,000, or 40,000 angstroms, measured before beginning a step of CMP processing.

FIG. 1 (not to scale) schematically shows an initial step height, h0, and an initial trench thickness, t0, of a substrate, before polishing. After polishing, step height is reduced to h1 and trench thickness is reduced to t1.

Referring to FIG. 1, illustrated is an exemplary substrate having an initial step height h0 and an initial trench thickness is t0. The material of the step height can be mostly dielectric such as TEOS, BPSG, or other amorphous silica-containing materials. The key step in 3D NAND dielectric (and other bulk oxide removal) processing is to reduce step height, h1, to a low number (e.g., <1000 or <900 angstroms) at a trench loss (t0-t1) as low as possible. For good planarization efficiency, the final step height must be achieved at a reasonable trench loss. This requires a slurry with a higher removal rate on the active (raised) areas than at the trench area. Additionally, preferred slurries will result in a "self-stopping" or "stop on planar" behavior, to allow for more effective final polishing that does not cause over-polishing. Desired slurries have a much higher pattern removal rate (removal rate at active areas) compared to the removal rate on blanket (substantially smooth) dielectric material.

Removal rate of dielectric material at active areas is referred to as a removal rate of pattern material (e.g., pattern oxide) or "pattern removal rate" or "active removal rate." The pattern removal rate achieved using a process and slurry as described can be any useful rate, and for any given process and substrate will depend in great part on the dimensions (e.g., width) of the raised areas. According to preferred processes, a removal rate of pattern dielectric material can be at least 2,000 angstroms per minute, preferably at least 4,000 angstroms per minute, such as at least about 5,000 or 6,000 angstroms per minute, optionally even up to 10,000, 14,000, or 15,000 angstroms per minute.

According to preferred processes of CMP planarization of substrates described herein, the pattern dielectric can be processed to a planarized surface by CMP processing of the pattern dielectric for a time that is less than 5 minutes, e.g., less than 3, 2, or 1 minute. This can be accomplished for a substrate with pattern dielectric that includes a step height of at least 7,000 or 10,000, e.g., 20,000, 30,000, or 40,000 angstroms. The surface is considered to be effectively planarized upon achieving a reduced (by polishing) step height (i.e., a "remaining" step height) of less than 1,000 angstroms, e.g., less than 900 angstroms, 500 angstroms, 300 angstroms, or 250 angstroms.

Also according to certain preferred processes using slurry as described, trench loss can be reduced and planarization efficiency can be improved relative to slurries that do not contain hydroxamic acid, substituted hydroxamic acid, or salicylhydroxamic acid. Trench loss refers to the difference between a thickness of a trench (t0) before CMP processing, less the thickness of the trench after CMP processing (t1); trench loss equals t0-t1 (see FIG. 1) (for a given processing time or result). According to preferred processes and slurries, the amount of trench loss that will occur during polishing to planarization (defined, e.g., by a "remaining" step height of less than 1,000 angstroms, e.g., less than 900, 500, 300, or 250 angstroms), or for a given amount of processing time, can be decreased by the presence of hydroxamic acid, substituted hydroxamic acid, or salicylhydroxamic acid, in a slurry as described; i.e. trench loss for a process as described, using a slurry as described (containing hydroxamic acid, substituted hydroxamic acid, or salicylhydroxamic acid), will be substantially less than (e.g., at least 10, percent less than) an amount of trench loss that would otherwise occur using the same process to process the same substrate with slurry that is similar but does not contain hydroxamic acid, substituted hydroxamic acid, or salicylhydroxamic acid.

A lower trench loss can be reflected in planarization efficiency, which refers to step height reduction (angstroms) divided by trench loss (angstroms) for a process. According to preferred processes of the present description, planarization efficiency can be improved by the presence of hydroxamic acid, substituted hydroxamic acid, or salicylhydroxamic acid, in a slurry as described; i.e., planarization efficiency for a process as described, using a slurry as described (containing hydroxamic acid, substituted hydroxamic acid, or salicylhydroxamic acid), will be substantially greater than (e.g., at least 10 percent greater than) a planarization efficiency that would occur using a similar process and similar slurry (but not containing hydroxamic acid, substituted hydroxamic acid, or salicylhydroxamic acid), when processing a similar substrate and using identical process conditions and equipment. Desirable levels of planarization efficiency (step height reduction divided by trench loss) of a process as described can be at least 2.0, preferably at least 3.0, such as at least about 3.5.

Preferred processes can also exhibit self-stopping behavior, meaning that the removal rate of dielectric material from blanket dielectric (upon reaching a step height of less than 1,000 angstroms, 900 angstroms, 500 angstroms, or less than 300 or 200 angstroms) (i.e., the "blanket removal rate") is significantly lower than pattern removal rate of the same process. According to preferred processes of the present description, self-stopping behavior is considered to occur if a removal rate of blanket dielectric material is less than 1,000 angstroms per minute, preferably less 800 angstroms per minute, e.g., less than about 500 angstroms per minute.

By another measure, self-stopping behavior may be measured by comparing the blanket removal rate to pattern removal rate. A low ratio of blanket removal rate to pattern removal rate indicates good self-stopping behavior. According to preferred processes, a ratio of blanket removal rate to pattern removal rate using a slurry as described herein can be less than 1, e.g., less than 0.5 or less than 0.1. This ratio will be lower for a process as described, using a slurry as described (containing hydroxamic acid, substituted hydroxamic acid, or salicylhydroxamic acid), as compared to a ratio that would occur using the same process to process the same substrate with slurry that is similar but does not contain hydroxamic acid, substituted hydroxamic acid, or salicylhydroxamic acid.

EXAMPLES

The present disclosure is based on the discovery of a chemical agent that provides unexpectedly good planarization efficiency and self-stopping behavior in a ceria-containing slurry, as shown by the following examples. In the examples below, the polishing "control slurry" is a ceria-based slurry as described in Applicant's co-pending patent application Ser. No. 14/639,564. The "control slurry" (including as presented in the "control slurry historical curve) includes ceria particles (0.3%), picolinic acid (500 ppm), and has a pH of about 4.0. The ceria particles of the control slurry were of a D50 particles size of 100 nanometers.

The polishing tool used was a Mirra; down force pressure was 3 pounds per square inch; slurry flow rate was 150 milliliters per minute. The pattern wafers included an initial step height of 2 microns and were made of TEOS ("pattern wafers"). The pattern wafers contained several different feature sizes, such as 10×10×3 millimeter (mm) (10×10 denoting feature dimensions and 3 mm denoting trench width), and 5×5×3 mm, among others. Unless otherwise indicated, polishing time on the 3D NAND pattern wafer was from 150-190 seconds, and from 45-65 seconds for STI-10K pattern wafers. The polishing pad used was R200-01 pad commercially available from Cabot Microelectronics, and conditioner was Sasol C7. As demonstrated, salicylhydroxamic acid provides unexpectedly good performance of self-stopping and planarization efficiency (due to reduced trench loss).

Example 1

Figure 2:
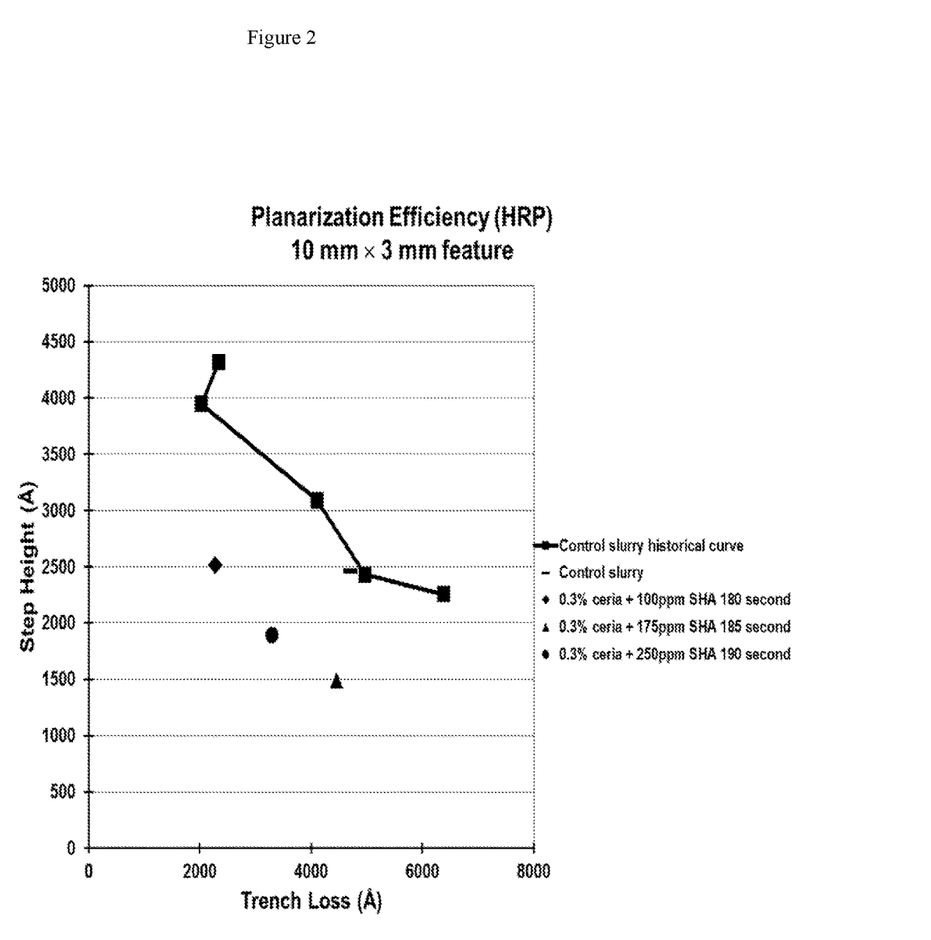
FIGS. 2, 3, and 4, show performance features of inventive and comparative (though not necessarily prior art) slurries.

FIG. 2 shows the high resolution profilometer measurement of the polished pattern wafer with control slurry and with ceria slurry containing SHA (salicylhydroxamic acid). Feature size of interest is 10 mm×10 mm×3 mm, 10 mm being the active (elevated area) and 3 mm being the trench area. As indicated by the chart, at 2500 angstrom (Å) step height, the control slurry loses around 4800 Å of trench oxide, while the 100 ppm SHA slurry reduces that to 2400 Å, 50% reduction in oxide loss. Stated differently, at fixed trench loss, say 4000 Å, the SHA slurry can get down to ~1500 Å step height, while control slurry has 3000 Å step height. SHA slurries reduce final step height by ~50%. This example demonstrates that SHA-containing ceria slurries have good planarization efficiency relative to slurries that are otherwise comparable except do contain alternate chemistry (e.g., picolinic acid) and do not contain SHA.

Example 2

Figure 3:
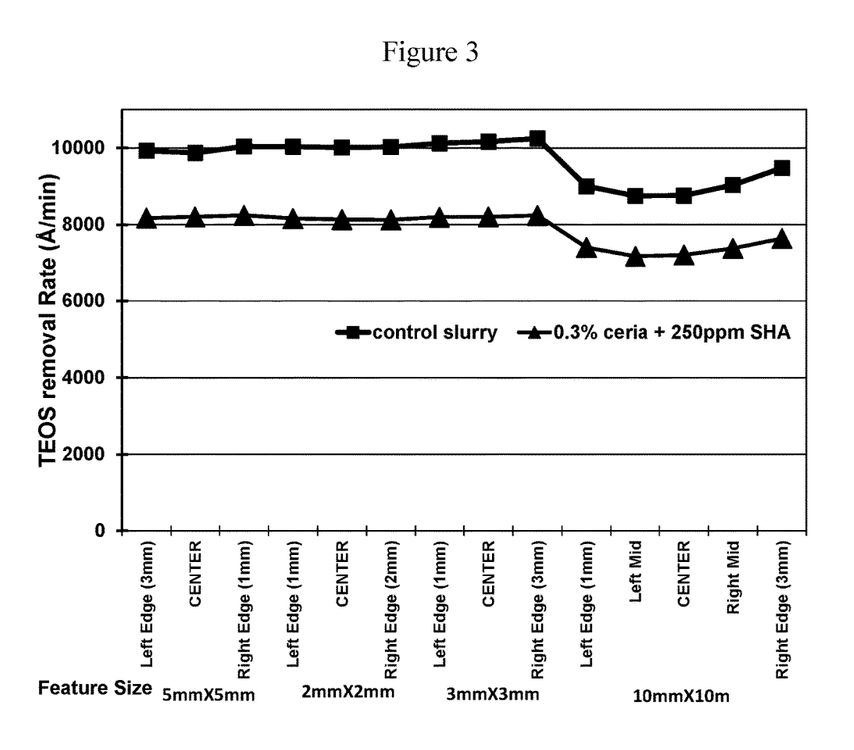
Figure 4:
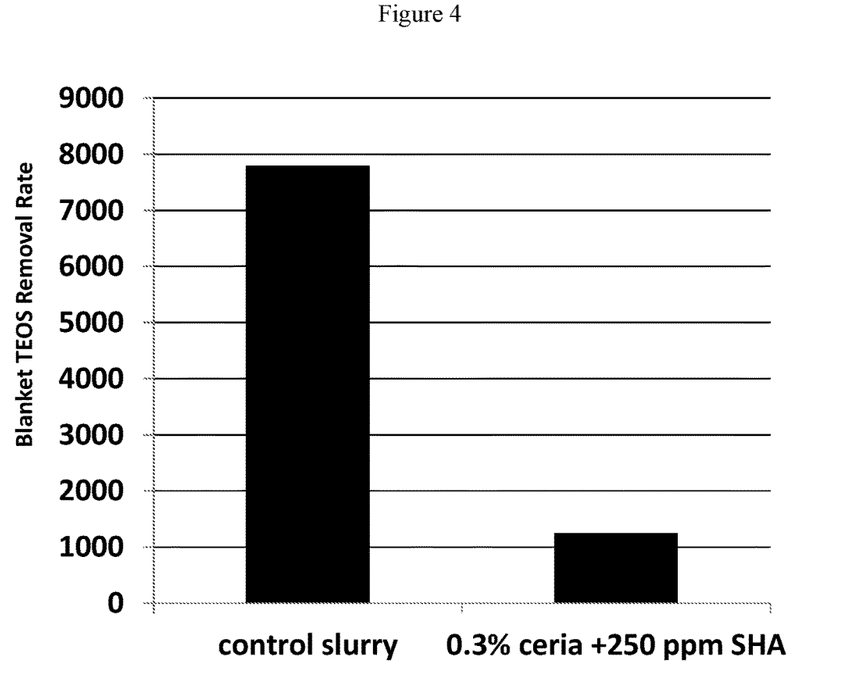

FIGS. 3 and 4 show self-stopping behavior unexpectedly resulting from the presence of SHA in a ceria-based slurry. In this example, SHA is included in the slurry with ceria. The "control slurry" is as previously described, including ceria and picolinic acid with no SHA. FIG. 3 shows the pattern removal rate as a function of pattern density features; it can be seen that the control slurry and the SHA-containing slurry have somewhat similar pattern removal rates, the difference being is only about 20 percent. FIG. 4 shows the blanket removal rate of the SHA-containing slurry is dramatically lower than the blanket removal rate of the control slurry, i.e., about 1000 Å/min vs about 8000 Å/min. This dramatically lower blanket removal rate demonstrates "self-stopping" behavior that is highly advantageous in improving planarization efficiency (PE) and process operation window. For example, when polishing pattern wafers, such low blanket removal rate translates to a wider over-polishing window, because at the end of polishing the wafer feature becomes more like a blanket wafer region, and a low removal low rate can be advantageous in terms of reducing trench loss. In this example, pattern removal rate to blanket removal ratio is about 7 for the SHA-containing slurry.

Example 3

The polishing condition is the same as example 1 and 2, except IC1010 pad is used instead of R200-01 pad, and STI-10K wafer is used instead of the pattern wafer of examples 1 and 2. STI-10K wafer has 10,000 Å step height compared to the 20,000 Å step height of the pattern wafer, and feature sizes are smaller than 1 mm across the STI-10K wafer. Example slurry contains ceria 0.3%+175 ppm SHA+ 50 ppm picolinic acid, and a pH adjusted to 4.0. The example slurry has pattern removal rate of about 7500 Å/min at 900×900×900 micron feature (900 micron being active square dimension and trench width), while removal rate on blanket wafer is less than 250 Å/min removal rate. In this example, pattern removal rate to blanket removal rate is about 30, resulting in a desirable self-stopping slurry. In contrast, control slurry has pattern removal rate of 7900 Å/min but blanket removal rate of 7800, pattern to blanket ratio of about 1.0.

The invention claimed is:

1. A method of polishing a dielectric-containing surface of a substrate, the method comprising:
   providing a substrate comprising a surface that includes a pattern dielectric material comprising raised areas of the dielectric material and trench areas of the dielectric material, a difference between a height of the raised areas and a height of the trench areas being step height, wherein an initial step height of the substrate is at least 1000 angstroms,
   providing a polishing pad,
   providing a chemical-mechanical polishing composition comprising:
      an aqueous medium,
      abrasive particles dispersed in the aqueous medium, and
      hydroxamic acid or substituted hydroxamic acid of the formula:

wherein R is selected from the group consisting of: hydrogen, alkyl, cycloalkyl, aryl, heterocyclic alkyl, and heterocyclic aryl, any of which may be substituted,
   the slurry having a pH of below about 7,
   contacting the substrate with the polishing pad and the chemical-mechanical polishing composition; and
   moving the polishing pad and the chemical-mechanical polishing composition relative to the substrate to abrade at least a portion of the silicon oxide layer on a surface of the substrate to polish the substrate, wherein a planarization efficiency for the polished substrate is at least 2.0.

2. The method of claim 1 wherein R is 2-hydroxyphenyl, a $C_1$ to $C_5$ branched or straight chain alkyl-substituted phenyl, or a $C_1$ to $C_5$ branched or straight chain alkyl (e.g., saturated) group.

3. The method of claim 1 wherein the hydroxamic acid or substituted hydroxamic acid is salicylhydroxamic acid:

4. The method of claim 1 wherein the hydroxamic acid or substituted hydroxamic acid is present in the polishing composition at a concentration of about 5 to about 3,000 parts per million.

5. The method of claim 1 wherein the pattern dielectric consists of dielectric material selected from silicon oxide, tetraethoxysilane, phosphosilicate glass, or borophosphosilicate glass.

* * * * *